April 3, 1951 C. A. BERGFORS 2,547,434

HIGH-SPEED BINARY DECADE COUNTER

Filed Dec. 11, 1948 3 Sheets-Sheet 1

INVENTOR
Carl A. Bergfors
BY Dwight D. Mooney
AGENT

April 3, 1951 C. A. BERGFORS 2,547,434

HIGH-SPEED BINARY DECADE COUNTER

Filed Dec. 11, 1948 3 Sheets-Sheet 2

INVENTOR
Carl A. Bergfors
BY Dwight D. Mooney
AGENT

April 3, 1951 C. A. BERGFORS 2,547,434

HIGH-SPEED BINARY DECADE COUNTER

Filed Dec. 11, 1948 3 Sheets-Sheet 3

Fig. 2.

| COUNTER SETTING | TRIGGERS | | | | ISOLATING TUBE | | | SWITCHING TUBE | | BLOCKING TRIGGER | BLOCKING TUBE |
|---|---|---|---|---|---|---|---|---|---|---|---|
| | A | B | C | D | V1T | V2T | V3T | S1T | S2T | T | BLT |
| 0 | 0 | 0 | 0 | 0 | X | 0 | X | 0 | 0 | X | X |
| 1 | X | 0 | 0 | 0 | 0 | 0 | X | 0 | NP | 0 | 0 |
| 2 | 0 | X | 0 | 0 | X | 0 | X | 0 | 0 | 0 | 0 |
| 3 | X | X | 0 | 0 | 0 | 0 | X | 0 | NP | 0 | 0 |
| 4 | 0 | 0 | X | 0 | X | NP | 0 | 0 | 0 | 0 | 0 |
| 5 | X | 0 | X | 0 | 0 | 0 | 0 | 0 | NP | 0 | 0 |
| 6 | 0 | X | X | 0 | X | 0 | 0 | 0 | 0 | 0 | 0 |
| 7 | X | X | X | 0 | 0 | 0 | 0 | 0 | NP | 0 | 0 |
| 8 | 0 | 0 | 0 | X | X | NP | X | X | 0 | X | X |
| 9 | X | 0 | 0 | X | 0 | 0 | X | X | 0 | X | X |
| 0 | 0 | 0 | 0 | 0 | X | 0 | X | 0 | 0 | X | X |
| 1 | X | 0 | 0 | 0 | 0 | 0 | X | 0 | NP | 0 | 0 |

INVENTOR
Carl A. Bergfors
BY Dwight D. Mooney
AGENT

Patented Apr. 3, 1951

2,547,434

UNITED STATES PATENT OFFICE 2,547,434

HIGH-SPEED BINARY DECADE COUNTER

Carl A. Bergfors, Yonkers, N. Y., assignor to International Business Machines Corporation, New York, N. Y., a corporation of New York Application December 11, 1948, Serial No. 64,852

10 Claims. (Cl. 250—27)

Figure 1:
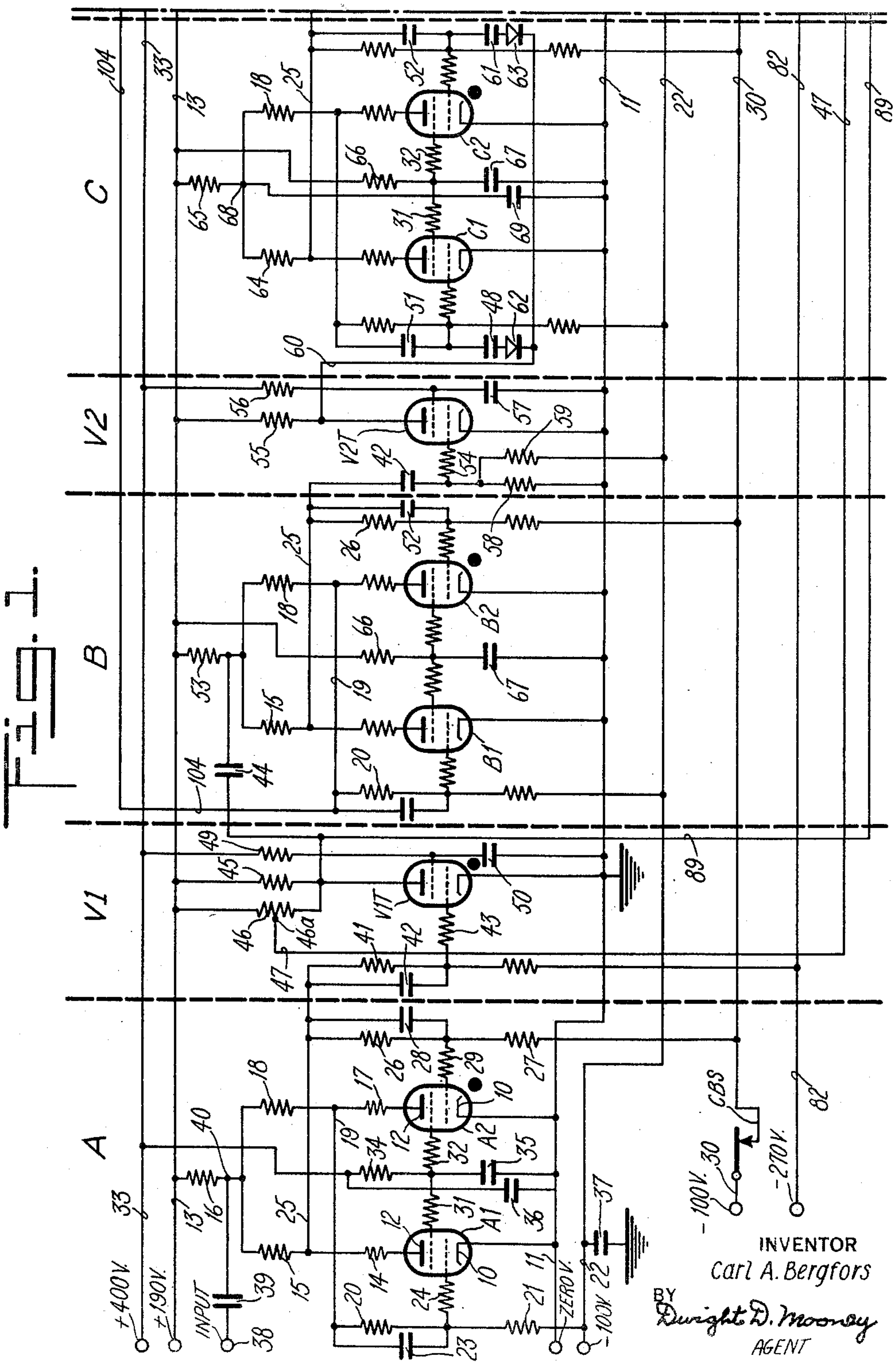

This invention relates to decade counters and more particularly to a high speed decade counter of the electronic type utilizing inherently trigger circuits.

One arrangement of the prior art for converting from binary to decade counting utilizes capacitive feedback means for blocking or switching the stable condition of one or more triggers. Such an arrangement does not lend itself to counting at high speeds because of the frequency discrimination of the resistive-capacitive circuits which limit the maximum speed of counter operation.

Another arrangement of the prior art for accomplishing the conversion to decade counting employs grid controlled tubes for blocking or switching the stable condition of one or more triggers at certain predetermined times during the cycle of counter operation. The tube for blocking the operation of a trigger is made non-conductive to nullify its blocking effect in response to a chosen stable condition of one trigger. This is undesirable because the trigger which was blocked may cause a change in the stable condition of the next higher trigger circuit after release of the blocking tube due to the fixed time delay or the trigger remains blocked and thereby prevents operation of the next higher trigger to subsequent pulses to be counted.

A principal shortcoming of the counters of the prior art is their inability to count at very high speeds. The limitation of the counting speed is imposed because of several reasons. Among these reasons, in addition to those pointed out above, are the following: the lack of proper shielding between the individual stages of the counter, the use of relatively large non-inductive plate load resistors, short-circuiting of the control grids of the tubes comprising the triggers which are grid keyed and the undesirable feedback and loading effects of one trigger on another.

Accordingly, it is the principal object of this invention to provide a decade counter from a series of inherently binary triggers wherein the above shortcomings of the prior art are avoided.

Another object is to provide an improved, high speed decade counter comprising a series of triggers and a plurality of grid controlled tubes connected in novel relationship therewith.

A further object is to provide means intermediate the triggers for preventing the reaction of one from affecting the others.

Another object is to provide means for preventing inter-action between the inter-connected control grids of the tubes of each trigger when the counter is operated at high speeds.

A further object is to provide blocking means for converting from binary to decade operation wherein said blocking means is operative during a predetermined number of counter settings spanning the preselected zero position or tenth count.

A further object is to provide a novel blocking circuit automatically timed to be effective by the counter irrespective of the initial status of the blocking circuit when the counter is rendered operable.

A still further object is to render the blocking means ineffective by switching one trigger circuit to that stable condition which does not tend to switch any other trigger circuit.

Other objects of the invention will be pointed out in the following description and claims and illustrated in the accompanying drawings, which disclose, by way of example, the principle of the invention and the best mode, which has been contemplated, of applying that principle.

Figure 1A:
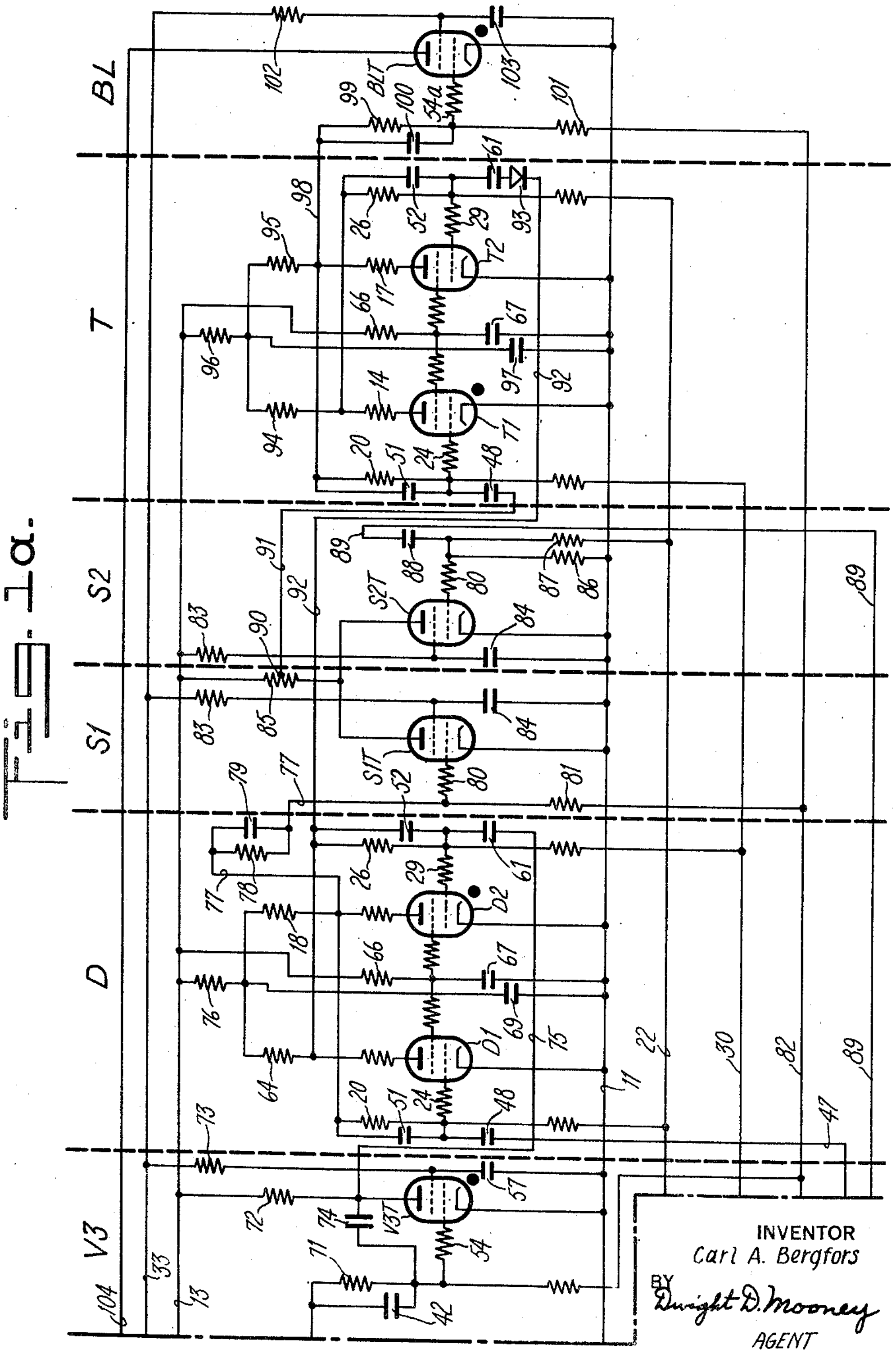

In the drawings:

Figs. 1 and 1*a*, taken together, comprise a circuit diagram illustrating one embodiment of the invention.

Fig. 2 is a table showing the condition of the various triggers and other tubes of the circuit for one complete cycle of counter operation.

Referring more particularly to Figs. 1 and 1*a*, the circuit of the counter comprises generally four triggers A, B, C and D; three isolating circuits V1, V2 and V3 connected, respectively, between triggers A and B, B and C, and C and D; switching circuits S1 and S2; blocking trigger T and a blocking circuit BL; each separated in the drawings, by broken vertical lines. Each of the tubes used in a type 6L6 tetrode beam power amplifier, but it is to be understood that any suitable type tube may be used without departing from the principles set forth herein.

Each trigger A, B, C and D and the blocking trigger T has two stable conditions, alternately assumed, and designated herein as the "off" and "on" conditions. A trigger is in the "off" condition when its right-hand tube is conductive and its left-hand tube is simultaneously non-conducting and is in the "on" condition when its right-hand tube is non-conductive and its left-hand tube is simultaneously conductive, e. g., in Fig. 1, trigger A is "off" when tube A2 is conductive and tube A1 is non-conductive, as shown, but the trigger A is "on," when tube A2 is non-conductive and tube A1 is conductive. At the zero or preselected starting condition, triggers A, B, C and D are "off" and the blocking trigger is "on," all as shown. A dot to the right of tubes A2, B2, C2, D2, V1T, V3T, T1 and BLT indicates that they are conductive when the counter is in the preselected starting condition. Each tube socket is contained in an individually shielded compartment. Tube V2T is non-conductive in the preselected starting condition, as shown in Fig. 1.

The arrangement and operation of trigger A will be described with reference to the values of applied voltage and the values of resistances and capacitances. The operation of the triggers B, C, D and T is similar to that of trigger A, unless otherwise noted.

Cathodes 10 of tubes A1 and A2 are connected to a zero volt line 11 and plates 12 are connected to a +190 volt line, the plate of tube A1 being connected through resistors 14, 15 and 16 in series and the plate of the tube A2 being connected through resistors 17, 18 and, again, 16, in series, having a combined value equal to that of resistors 14, 15 and 16. Resistors 14, 15, 16, 17 and 18 are of 47, 1000, 535, 47 and 1000 ohms, respectively. A lead 19 connected to the top of resistor 17, thereby connects the plate 12 of the tube A2 to the upper end of a voltage divider consisting of resistors 20 and 21, each of 33,000 ohms. The lower end of this voltage divider is connected to the −100 volt bias line 22. A capacitor 23 of 0.000213 microfarad is connected in parallel with the resistor 20 whose lower end is connected to the control grid of tube A1 through a resistor 24 of 330 ohms, provided to suppress parasitics in tube A1.

Similarly, a lead 25 connected to the top of resistor 14 thereby connects the plate of tube A1 to the upper end of a voltage divider consisting of resistors 26 and 27, each of 33,000 ohms. A capacitor 28 of 0.000213 microfarad is connected in parallel with resistor 26 whose lower end is connected to the control grid of tube A2 through a resistor 29 of 330 ohms, provided to suppress parasitics in tube A2. The lower end of the divider is connected to a −100 volt cancel bias line 30 provided with cancel bias switch CBS to provide for quick resetting of the trigger to the preselected starting condition by simply opening and closing this switch. When switch CBS is opend, the grid bias of tube A2 rises slightly above the zero value so that tube A2 is made conductive. The closing of switch CBS restores the circuit to operable condition with all triggers in their preselected starting condition, and tube A2 remains conductive until the stable condition of the trigger is changed by the application thereto of a negative pulse of suitable characteristics.

It should be noted that all the plate resistors used in the counter of this invention are of the wire-wound 10-watt type and have much smaller values of resistance than the corresponding resistors in known counters. It has been found that the inductance inherent in these wire-wound resistors increases the operating speed of the counter.

The screen grids of the tubes A1 and A2 are connected together through parasitic suppressor resistors 31 and 32, each of 100 ohms, while the junction of these resistors is connected through a resistor 34 of 535 ohms to a +400 volt line 33 and through a capacitor 35 of 0.05 microfarad to the zero volt line 11.

A smoothing capacitor 36 is connected between the +400 volt line and ground and a smoothing capacitor 37 is connected between the −100 volt bias line 22 and ground.

Each trigger has two stable conditions, alternately assumed, and is connected to produce an output to energize the next higher trigger, only in response to each second entry received. This means that for straight binary operation, each trigger will operate at twice the speed of the next higher one, with the first trigger operating at the speed of application of the input pulse entries. Hence, to obtain higher speed operation of the counter as a whole, it is most necessary to increase the maximum operating speed of the first and second triggers, per se. To effect an increase in their individual maximum speed of operation, triggers A and B are switched from one stable condition to the other in response to negative pulses which are impressed on their respective plate circuits, this mode of switching being known in the art as plate keying.

An input terminal 38 is connected through a capacitor 39 to a point 40 in the plate circuit of trigger A to provide for plate keying and this input terminal is connected to the source of negative pulses to be counted which pulses have characteristics suitable to effect a change in the stable condition of trigger A.

Positive pulses having a value equal to that of the negative pulses to be counted will not effect a change in the stable condition of any trigger, because the parameters of the circuit are chosen so as to render the triggers non-responsive to positive pulses.

When a negative pulse is applied to the terminal 38, it causes a corresponding decrease in potential at the plates and control grids of tubes A1 and A2. The decrease at the control grid of tube A1 has no direct effect since its control grid is already below cutoff potential. The decrease at the control grid of tube A2, however, renders it non-conductive and the resulting increase of its plate voltage, toward that of the line 13, is transferred over the parallel connected resistor 20 and capacitor 23 and over the parasitic resistor 24, to the control grid of tube A1. This produces conduction through the tube A1 with a corresponding decrease of voltage at its plate. The decrease of voltage at the plate of tube A1 is transferred over lead 25, parallel connected resistor 26 and capacitor 28, and over the parasitic resistor 29, to the control grid of tube A2, and, in accordance with the well-known trigger action, maintains tube A2 non-conductive until the next negative pulse is applied to terminal 38. It is seen, therefore, that the first negative pulse applied to terminal 38 changes trigger A from the "off" condition, as shown, to the "on" condition.

When trigger A so changes to the "on" condition, a negative pulse is transferred from the plate of the conducting tube A1 over lead 25, parallel connected resistor 41 and capacitor 42 and the parasitic resistor 43 to the control grid of an isolating tube V1T of the isolating tube circuit V1. This pulse swings the control grid of tube V1T below cutoff and renders the tube non-conductive.

The plate of V1T is connected via a capacitor 44 of 0.0001 microfarad to a point 40 in the plate circuit of trigger B and the plate of V1T is also connected via parallel connected resistor 45 of 1200 ohms and resistor 46 of 1000 ohms to the +190 volt line 13. Tap 46*a* (Fig. 1) on resistor 46 is connected by a lead 47 (Figs. 1 and 1*a*) and a capacitor 48 of 0.00004 microfarad to the control grid of the tube D1 of trigger D. The screen grid of tube V1T is connected via resistor 49 of 22,000 ohms to the +400 volt line 33 and is also connected via a capacitor 50 having a value of 0.03 microfarad to the zero volt line 11.

Referring to trigger B, which is generally similar to trigger A, there are provided capacitors 51 and 52 each having a value of 0.00025 microfarad in parallel with resistors 20 and 26. A resistor 53 connected between the line 13 and plate resistors 15 and 18, has a value of 600 ohms.

The switching of trigger B from "on" to "off"

causes only momentary conduction through the tube V2T because of the effect of the coupling capacitor 42.

Variations of voltage in the plate circuit of the tube B1 are transferred via lead 25, this capacitor 42 and a parasitic suppressor resistor 54 of 100 ohms to the control grid of a tube V2T in the isolating circuit V2. The plate of V2T is connected via a resistor 55 of 570 ohms to the +190 volt line 13. The screen grid of V2T is connected via a resistor 56 of 24,000 ohms to the +400 volt line 33 and is also connected via a capacitor 57 of 0.03 microfarad to the zero volt line 11. Two bias resistors 58 and 59 of 150,000 and 300,000 ohms, respectively, connected between the control grid parasitic resistor 54 and the respective lines 11 and 22, serve to maintain the average value of D. C. bias of tube V2T sufficiently negative to prevent the small pulse produced at the plate of tube B1, in response to the tenth pulse applied to the counter, from effecting a switching of the trigger C.

This isolating tube V2T is capacitively coupled to its preceding trigger while the other isolating tubes are each conductively connected to their respective preceding trigger.

Changes in the plate voltage of the tube V2T are transferred via a lead 60, rectifier 62, capacitor 48 of 0.00004 microfarad and a parasitic suppressor resistor to the control grid of tube C1 of trigger C and via this same lead 60, rectifier 63, capacitor 61 of 0.00004 microfarad and a parasitic suppressor resistor to the control grid of tube C2, of trigger C.

These rectifiers 62 and 63 are type 1N27 germanium crystals. During operation of the counter, the control grids of the tubes of each trigger circuit are normally in phase opposition to each other. As the speed of counting, however, is increased, the capacitive reactance between the control grids decreases correspondingly, until the two grids tend to lock together thereby preventing normal trigger operation and placing an upper limit on the speed of counter operation. These rectifiers 62 and 63 eliminate the tendency of the grids to lock together and effectively decouples them in that they permit current to flow away from each grid and not from one grid into the other. These rectifiers 62 and 63 need not necessarily be germanium crystals but may comprise any suitable type rectifier such as diode type vacuum tubes.

In the plate circuit of trigger C, a resistor 64 of 800 ohms is connected to the plate of tube C1 and a resistor 65 is connected to the plate of tube C2. These resistors correspond to resistors 15 and 16, respectively, of trigger A. The screen grids of the tubes of trigger C, as in triggers A and B, are connected together through parasitic resistors 31 and 32. In triggers B and C these resistors are connected through a resistor 66 of 1000 ohms to the +190 volt line 13 and through a capacitor 67 of 0.03 microfarad to the zero volt line 11. The point 68 in the plate circuit of trigger C at the conjunction of resistors 18, 64 and 65 is connected through a capacitor 69 of 16 microfarads to the zero volt line 11. This capacitor serves to maintain the voltage at point 68 substantially constant.

Changes in the plate voltage of tube C1 of trigger C are transferred via its lead 25, capacitor 42, resistor 71 of 130,000 ohms and a parasitic resistor 54 to the control grid of tube V3T of isolating circuit V3, Fig. 1a. The plate of V3T is connected through resistor 72 of 460 ohms to the +190 volt line 13 and its screen grid is connected through a resistor 73 of 39,000 ohms to line 33. An inverse feedback capacitor 74 of 0.000025 microfarad connected between the plate of V3T and its parasitic resistor 54 effects an improvement in the output wave form of V3T. This output is transferred over a lead 75 and through a capacitor 61 and a parasitic resistor 29 to the control grid of the tube D2 of trigger D where it will effect a switching of trigger D from "off" to "on" when tube V3T is rendered conductive.

The plate circuits of tubes D1 and D2 are connected through a common resistor 76 to the +190 volt line 13. Changes in the plate voltage of tube D2 are transferred over a lead 77, parallel connected resistor 78 and capacitor 79 of 100,000 ohms and 0.0001 microfarad, respectively, and a parasitic resistor 80 of 1200 ohms to the control grid of switch tube S1T of switch circuit S1. This control grid is connected via a bias resistor 81 of 360,000 ohms to a minus 270 volt line 82. The screen grid of S1T is connected through a resistor 83 of 2500 ohms to the +400 volt line 33 and through a capacitor 84 of 0.03 microfarad to the zero volt line 11.

A resistor 85 of 1100 ohms connected between the +190 volt line 13 and the plates of switch tubes S1T and S2T serves as a common plate load for these tubes. The control grid of S2T is connected via a parasitic resistor 80 and a resistor 86 of 180,000 ohms to zero volt line 11, while a resistor 87 of 360,000 ohms is connected between this control grid and the minus 100 volt line 22. This control grid is also connected through a capacitor 88 and a lead 89 (Figs. 1a and 1) to the plate of the isolating tube V1T and therefore receives a positive pulse each time tube V1T becomes non-conductive.

Changes in voltage at the potential point 90 on resistor 85 of switch tubes S1T and S2T are transferred over a lead 91 and through a capacitor 48 and a parasitic resistor 24 to the control grid of the tube T1 of the blocking trigger T for the purpose of switching trigger T "off" at "1" of each counter cycle to release the blocking circuit BL. The value of resistance between this potential point 90 and the line 13 is 665 ohms leaving 435 ohms of resistance between that point and the plates of tubes S1T and S2T.

Referring to trigger D, changes in voltage of the plate circuit of tube D1 are transferred over a lead 92, a type 1N34 germanium crystal rectifier 93, a capacitor 61 and a parasitic resistor 29 to the control grid of the tube T2 of the blocking trigger T.

Resistors 94 and 95 of 1000 and 800 ohms, respectively, in the plate circuits of tubes T1 and T2 are connected together, as shown, and this point of connection is connected through a resistor 96 of 1200 ohms to the +190 volt line 13 and through a capacitor 97 of 5 microfarads to the zero volt line 11.

Changes in the voltage of the plate circuit of the tube T2 are transferred over a lead 98 and through parallel connected resistor 99 and capacitor 100 of 100,000 ohms and 0.0001 microfarad, respectively, and the parasitic resistor 54a to the control grid of the blocking tube BLT of blocking circuit BL.

The control grid of the tube BLT is connected through this resistor 54a and a resistor 101 of 300,000 ohms to the minus 270 volt line 82 and its screen grid is connected through a resistor 102 of 2500 ohms to the +400 volt line 33 and through a capacitor 103 of 0.05 microfarad to the zero volt line 11. The plate of the tube BLT is connected through a lead 104 (Figs. 1a and 1) to the plate circuit of tube B2 of trigger B.

The parasitic suppressor resistors connected to the control grids of the tubes B1, B2, C1, C2, D1, D2, T1, T2 and BLT correspond to those resistors 24 and 29 of the control grids of tubes A1 and A2, respectively, except that each of the former has a value of 100 ohms while the parasitic resistors connected to the screen grids of tubes B1, B2, C1, C2, D1, D2, T1, T2 and BLT correspond to the resistors 31 and 32 of the screen grids of tubes A1 and A2, respectively.

The switching of trigger A from "off" to "on" in response to the first negative pulse impressed on the terminal 38 was explained above. A similar action switches trigger A from the "on" to "off" in response to the second negative pulse applied to this terminal 38. Subsequent negative pulses, so applied, cause a repetition of the switching action of the first and second pulses.

The complete cycle of counter operation will now be described, with reference to the circuit diagram of Figs. 1 and 1a and the table of Fig. 2 which table illustrates the condition of each trigger and of each isolating and switching tube of the blocking tube BLT for each counter setting. In Fig. 2, X as applied to a trigger circuit indicates that it is in "on" and as applied to the tubes indicates that the particular tube is conductive while O indicates that a trigger is "off" and as applied to the tubes that the particular tube is non-conductive. With regard to tubes V2T and S2T of Fig. 2, the negative pulse representation (NP) indicates that these tubes V2T and S2T are momentarily conductive at the counter settings indicated with a consequent negative potential at their plates.

The condition of all counter elements upon application of the first negative input pulse is clear from the table of Fig. 2. When trigger A switches "off," in response to the second input pulse, the rise of plate voltage of the non-conducting tube A1 is transferred over the line 25, through parallel connected resistor 41 and capacitor 42 and the resistor 43 to the control grid of the tube V1T thereby causing V1T to become conductive so that its plate voltage decreases correspondingly.

This voltage decrease is transferred through capacitor 44 to the plate circuit of trigger B, causing it to switch from "off" to "on." When trigger B switches "on," the decrease in the plate voltage of the tube B1 is transferred over the lead 25, capacitor 42 and resistor 54 to the control grid of the tube V2T. Since V2T is already non-conductive, this has no effect.

The voltage decrease caused by the conduction of tube V1T is transferred via point 46a, lead 47 (Figs. 1 and 1a), capacitor 48 and the parasitic resistor 24 to the control grid of tube D1. This negative pulse has no effect because this tube is already non-conductive. Trigger D, therefore, remains "off," as shown for the second input pulse in the table of Fig. 2.

This voltage decrease at the plate of the tube V1T is also transferred through the lead 89 (Figs. 1 and 1a) and the capacitor 88 and resistor 80 to the control grid of the switching tube S2T but causes no effect on it because it is already non-conductive.

The third negative pulse applied to terminal 38 switches trigger A "on." The decrease in the plate voltage of the tube A1 is transferred to the control grid of the tube V1T and renders that tube non-conductive. A positive voltage pulse is thereupon transferred via tap 46a and the lead 47 (Figs. 1 and 1a) capacitor 48 and resistor 24 to the control grid of the tube D1 of trigger D. This positive pulse produces no effect and trigger D remains "off." At the same time a positive pulse is also transferred from the plate circuit of V1T over the lead 89 (Figs. 1 and 1a) condenser 88 and resistor 80 to the control grid of S2T to render that tube momentarily conductive as illustrated in the table of Fig. 2, for counter setting 3.

The fourth input pulse switches trigger A "off" and trigger A renders the tube V1T conductive. The negative pulse thereupon transferred over the lead 89 to the control grid of the tube S2T but has no effect on it since tube S2T is already non-conductive. The negative pulse transferred from the plate of the tube V1T through the capacitor 44 to the plate circuit of trigger B, switches that trigger "off." The increase in plate voltage of the tube B1, is transferred over the lead 25 and through the capacitor 42 to the control grid of the tube V2T and renders it momentarily conductive. When tube V2T becomes conductive, the decrease in its plate voltage is transferred over the lead 60 to both the control grids of the tubes of trigger C and switches that trigger "on."

The fifth input pulse switches trigger A "on" which renders the tube V1T non-conductive and a positive pulse is transferred over the lead 89 and through the capacitor 88 to the control grid of S2T to render it conductive.

The sixth input pulse switches trigger A "off," renders tube V1T conductive, switches trigger B "on" and applies a negative pulse to the tube S2T but has no effect on it since it is already non-conductive.

The seventh input pulse switches trigger A "on" which renders the tube V1T non-conductive and thus tube S2T momentarily conductive.

The eighth input pulse switches trigger A "off" which renders the tube V1T conductive. When tube V1T becomes conductive it switches trigger B "off." The increased voltage thus produced at the plate of the tube B1 is transferred over the lead 25 to the control grid of the tube V2T and renders it momentarily conductive. When tube V2T becomes momentarily conductive, it switches trigger C "off" which renders the tube V3T conductive. The decreased voltage at the plate of tube V3T is transferred over the lead 75 and through the capacitor 61 to the control grid of the tube D2 of trigger D and switches trigger D "on." When trigger D switches "on," the increased plate voltage of the tube D2 is transferred over the lead 77 to the control grid of the tube S1T and renders it conductive. The decreased plate voltage of the tube D1 is transferred over the lead 92, through the rectifier 93 and the capacitor 61 to the control grid of the tube T2 to render it non-conductive, thereby switching trigger T "on." When trigger T switches "on," the increased voltage at the plate of the tube T2 is transferred over the lead 98 and through the parallel connected resistor 99 and capacitor 100 and resistor 54a to the control grid of the blocking tube BLT and renders it conductive. Since the plate of tube BLT is connected via line 104 to the control grid of tube B1 and to the plate of tube B2, trigger B is effectively blocked and thus cannot be switched "on" as long as tube BLT remains conductive.

The ninth input pulse switches trigger A "on" and trigger A renders the tube V1T non-conductive. In accordance with the previously described counter operation, tube S2T should be rendered conductive by tube V1T becoming non-conductive, under control of the ninth input pulse. However, the novel circuit arrangement of the invention causes tube S2T to be unaffected by this non-conductivity of V1T. The connection of both plates of the tubes S1T and S2T to the common load resistor 85 causes both these plates to be held at a low potential, when either one of the tubes is conductive. Because of the parallel connection of the plates of S1T and S2T, the positive pulse applied to the grid of S2T through the lead 89, following receipt of the ninth input pulse, is ineffective to further lower the plate potential of S1T and S2T. Thus no appreciable negative pulse is transmitted to the control grid of tube T1 and thus trigger T remains "on" as is apparent from the table of Fig. 2, and the blocking circuit BL continues effective to block trigger B.

The tenth input pulse switches trigger A "off" which causes V1T to become conductive and apply a negative pulse to trigger B. This negative pulse is ineffective to change the stable condition of trigger B because the conduction of blocking tube BLT, via line 104, holds the control grid of the tube B1 and the plate of the tube B2 at a potential sufficiently low to prevent switching of trigger B. However, with V1T so conductive, at this time, its decreased plate voltage is transferred over resistor 46 to point 46a and the lead 47 to the control grid of tube D1 and switches trigger D "off." When trigger D switches "off," the decreased plate voltage of the tube D2 is transferred over the lead 77 to the control grid of the tube S1T and renders it non-conductive. This same decreased voltage of D2, since it occurs in response to each tenth pulse to be counted, indicates one full decade operation of the counter and may be used for subsequent operations. The increased voltage at the plate of the tube D1 capacitively coupled to the control grid of the tube T2 tends to switch the trigger T, and thus causes unstable operation. The germanium crystal rectifier 93 of the 1N34 type is provided to prevent a change in the control voltage of the tube T2 in response to the increased plate voltage of the tube D1 and thereby produces stable operation of the blocking trigger T.

The complete action of the blocking circuit of this invention does not end when the cycle of counter operation ends but extends into the subsequent cycle and is terminated by the first count therein. This first pulse of the subsequent cycle switches trigger A "on" which renders the tube V1T non-conductive. The increased plate voltage of V1T is transferred over the lead 89 to the control grid of the tube S2T and renders it conductive. When S2T becomes conductive, the decreased voltage at the point 90 on the resistor 85 is transferred over the lead 91 to the control grid of the tube T1 of trigger T and renders that tube non-conductive to thus switch trigger T "off." When trigger T switches "off" the decreased plate voltage of the conducting tube T2 is transferred over the lead 98 to the control grid of the tube BLT and renders it non-conductive thereby releasing the blocked trigger B from the influence of the blocking tube until the eighth input pulse of this new cycle is impressed on the terminal 38.

It is seen that the blocking circuit becomes effective in response to the eighth pulse to be counted and becomes ineffective in response to the first pulse of the next subsequent cycle of counter operation. The operation of the blocking circuit is effective, therefore, to span the zero counter setting and assures uniform counter operation in response to each ten pulses to be counted, irrespective of the rate of counting.

It is emphasized that the blocking circuit is rendered ineffective in response to a pulse which switches trigger A "on." When trigger A switches "on," it renders the tube V1T non-conductive, and there is no tendency to switch subsequent triggers because there is no negative pulse transferred from the tube V1T. Hence, it follows that rendering the blocking circuit ineffective in accordance with this invention eliminates the probability of voltages applied to blocked triggers effecting a switching thereof and of subsequent triggers.

By arranging the timing of the blocking circuit so that its operating cycle spans the output or preselected zero condition of the counter, plate keying the first and second triggers, providing rectifier means to prevent high frequency short-circuits between the inter-connected control grids of the tubes of triggers and isolating the capacitive effect of each trigger from the others, a counter is provided which will operate with stability and accuracy at a much higher speed than the counters of the prior art. The counter described herein has been operated successfully at a range of speeds from 2 cycles per second up to 3.5 megacycles per second.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the followng claims.

What is claimed is:

1. A decade counter including four binary type trigger circuits each having a first and a second grid controlled tube and "on" and "off" conditions of stability; an isolating tube connected between adjacent trigger circuits for substantially isolating the reaction of each trigger circuit from the others; a first and second switching tube connected to be responsive respectively to the fourth trigger circuit when it is switched "on" and to an isolating tube when the first trigger is switched "on," said switching tubes having a common plate load so that one only is effectively conductive at a time; a blocking trigger circuit having "on" and "off" conditions alternately assumed, said trigger being turned "off" in response to a negative pulse conveyed thereto from said plate load and being turned "on" in response to a pulse conveyed thereto from the fourth trigger circuit when it switches "on," and a blocking tube having its plate connected to the second trigger circuit to prevent switching of its stable condition when said blocking tube is conductive, said blocking tube being connected to be rendered conductive and non-conductive in response to a change in the conductive condition of one tube of said blocking trigger.

2. A decade counter including a counter input and four binary type trigger circuits having first and second grid controlled tubes and connected in series chain to be rendered successively responsive to pulses; a grid controlled tube connected between successive trigger circuits and responsive to the lower one of said successive trigger circuits, said grid controlled tubes serving to increase the operable range of said counter; a connection from the second of said grid controlled tubes to both control grids of the third trigger circuit, each connection to said control grids including a rectifier; means for placing said counter in a preselected starting condition; a connection from the plate of the first of said grid controlled tubes to one tube of the fourth trigger circuit and from the plate of the third of said grid controlled tubes to the other tube of the fourth trigger circuit for switching the fourth trigger circuit and electronic means connected to be responsive to the fourth trigger circuit and one of said grid controlled tubes and having a blocking circuit including first and second grid controlled switching tubes interconnected so that conduction through one tube prevents effective conduction through the other, a connection from the fourth trigger circuit to one of said switching tubes and from the tube connected between the first and second trigger circuit to the other switching tube for rendering the switching tubes conductive and non-conductive in predetermined cyclic fashion, said blocking circuit rendering the second and third trigger circuits non-responsive over a predetermined range of counts and responsive during the remaining counts of the counter cycle.

3. The counter of claim 2 in which said blocking circuit includes a blocking trigger circuit having two stable conditions and connected to said switching tubes and said fourth trigger circuit; and a blocking tube stable in a high and a low condition of conduction and connected to said blocking trigger to be switchable from either condition to the other for causing said second trigger circuit to be non-responsive to predetermined counts during the counter cycle.

4. The counter of claim 2 in which said blocking circuit includes first and second grid controlled switching tubes inter-connected so that conduction through one tube prevents effective conduction through the other tube; a connection is provided from the fourth trigger circuit to one of said switching tubes and from the tube connected between the first and second trigger circuits to the other switching tube for rendering the switching tubes conductive and non-conductive in predetermined cyclic fashion; a blocking trigger circuit is provided having a pair of interconnected grid controlled tubes alternately conductive and non-conductive to represent two stable conditions; a connection is made from said switching tubes to one of the tubes of the blocking trigger circuit to render that tube non-conductive in accordance with the stable conditions of the switching tubes; a connection is made from the fourth trigger circuit through a rectifier to the other tube of the blocking trigger to render that tube non-conductive in response to a change in the stable condition of said fourth trigger circuit, said rectifier serving to prevent the flow of current from said fourth trigger circuit to said other tube of the blocking trigger and a grid controlled blocking tube having its plate connected to the second trigger circuit and its grid connected to the blocking trigger circuit so that it is energized and de-energized by the blocking trigger circuit during each counter cycle.

5. The counter of claim 2 in which said blocking circuit includes first and second grid controlled switching tubes inter-connected so that conduction through one tube prevents effective conduction through the other tube; a connection from the fourth trigger circuit to one of said switching tubes and from the tube connected between the first and second trigger circuits to the other switching tube for rendering the switching tubes conductive and non-conductive in predetermined cyclic fashion; a blocking trigger circuit is provided having a pair of interconnected grid controlled tubes alternately conductive and non-conductive to represent two stable conditions; a connection is made from said switching tubes to one of the tubes of the blocking trigger circuit to render that tube non-conductive in response to a change in the stable conditions of the switching tubes; a connection is made from the fourth trigger circuit through a rectifier to the other tube of the blocking trigger to render that tube non-conductive in response to a change in the stable condition of said fourth trigger circuit, said rectifier serving to prevent the flow of current from said fourth trigger circuit to said other tube of the blocking trigger; a grid controlled blocking tube having its plate connected to the second trigger circuit and its grid connected to the blocking trigger circuit so that it is energized and de-energized by the blocking trigger circuit during each counter cycle, the tubes of the trigger circuits are of the grid controlled type and the connection from the tube between the second and third trigger circuits to the third trigger circuit includes a connection from its plate to both control grids of the tubes of the third trigger circuit, a rectifier being connected in circuit with each control grid to prevent the flow of current from either grid to the other.

6. In a decade counter including a chain of inherently binary trigger circuits having two stable conditions alternately assumed in response to entries to be counted; an electronic tube connected between successive trigger circuits, said electronic tubes applying a voltage to the higher of said successive trigger circuits when voltage of preselected polarity is received from the lower one of said successive trigger circuits; a connection from the first electronic tube to the highest trigger circuit in said chain for switching the latter from one stable condition to the other; a grid controlled blocking tube connected to the second trigger circuit of said chain; electronic means connected to be responsive to one of said trigger circuits other than said second trigger circuit and connected to said blocking tube for causing plate current conduction through said blocking tube to render said second trigger circuit and higher ones in said chain, except the highest, non-responsive during a predetermined span of entries.

7. The counter of claim 6 wherein said electronic means includes a trigger circuit for controlling selectively the conduction of said blocking tube, an electronic switch connected to be selectively actuated from said highest trigger circuit in said chain and the electronic tube connected between the first and second trigger circuits, a coupling from said switch to the trigger circuit of said electronic means and a connection from the highest trigger circuit in said chain to that trigger circuit.

8. In an electronic counter including four chain connected trigger circuits each having a first and second grid controlled tube placed alternately in the conductive and non-conductive condition in response to pulses so that the trigger circuit is placed alternately in either of two stable conditions and having an isolating tube connected between two successive trigger circuits and to the fourth trigger circuit and a blocking tube connected to the higher of said two successive trigger circuits for rendering it non-responsive in cyclic fashion; a switching circuit responsive at a certain time in the counting cycle to the fourth trigger circuit and at a certain other time in the cycle to the condition of the isolating tube and a trigger circuit connected to be responsive to the switching circuit and to said fourth trigger circuit and coupled to said blocking tube for controlling the conduction of said blocking tube.

9. The apparatus of claim 8 wherein an isolating tube is interposed between successive trigger circuits, and wherein said switching circuit comprises two vacuum tubes having their plates connected in parallel so that said vacuum tubes are not simultaneously effectively conductive.

10. A decade counter including four trigger circuits each having a first and second tetrode type grid controlled tube placed alternately in the conductive and non-conductive conditions of stability in response to pulses to be counted so that the trigger circuit is placed alternately in one of two stable conditions, parallel connected capacitive and resistive elements cross coupling the plates and control grids of the tubes of each trigger, wire-wound load resistors connected in the plate circuits of each of said tubes, resistors connected to the grids and plate of said tubes for suppressing parasitics; means for placing said trigger circuits in a preselected starting condition; a first isolating tube having its control grid coupled to the plate of the first tube of the first trigger circuit and its plate capacitively coupled to the plate circuit of the second trigger circuit; a second isolating tube having its grid coupled to the plate circuit of the first tube of the second trigger circuit through a capacitor and its plate connected to the control grids of the third trigger circuit and momentarily conductive when said second trigger is switched to one stable condition; a rectifier connected to each control grid of said third trigger circuit and a connection therebetween to the plate of said second isolating tube, the rectifiers preventing current flow from either control grid to the other; a third isolating tube having its control grid connected to the plate circuit of the first tube of said third trigger circuit and its plate connected to the control grid of the second tube of the fourth trigger circuit to switch it to one stable condition in predetermined cyclic fashion and a connection from the plate circuit of said first isolating tube to the control grid of the first tube of the fourth trigger circuit to switch the fourth trigger circuit to the preselected stable condition in response to each tenth pulse to be counted; a first and a second grid controlled switching tube having their plates connected to a common resistor so that said tubes are not effectively conductive simultaneously; a connection from the plate of said first isolating tube to the control grid of said second switching tube and a connection from the plate circuit of the second tube of the fourth trigger circuit to the control grid of said first switching tube to render the first switching tube conductive in response to each eighth pulse and non-conductive in response to each tenth pulse; a blocking trigger circuit including a first and second grid controlled tube placed alternately in the conductive and non-conductive conditions of stability in response to negative pulses, a first connection from the plate resistor of said switching tubes to the control grid of the first tube, a second connection from the plate circuit of the first tube of the fourth trigger circuit through a rectifier to the control grid of the second tube to render it non-conductive when the first tube of the fourth trigger circuit is rendered conductive, said first connection causing said first tube to be rendered non-conductive when the second switching tube is rendered conductive in response to the first pulse to be counted and a blocking tube having its control grid connected to the plate circuit of the second tube of the blocking trigger circuit and its plate to the plate circuit of the second tube of the second trigger circuit, said blocking tube being conductive when the second tube of said blocking trigger is non-conductive thereby preventing a change in the stable condition of said second trigger circuit.

CARL A. BERGFORS.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,409,689 | Morton et al. | Oct. 22, 1946 |
| 2,441,963 | Gray | May 25, 1948 |
| 2,478,683 | Bliss | Aug. 9, 1949 |

OTHER REFERENCES

Proceedings of the Cambridge Philosophical Society, vol. 33, 1937, "A Scale-of-Two High-Speed Counter Using Hard Vacuum Triodes," by Lewis, pages 549–558.

Review of Scientific Instruments, vol. 9, March 1938, "A Triode Vacuum Tube Scale-of-Two Circuit," by Lifschutz et al., pages 83–89.

Electronics, June 1944, "A Four-Tube Counter Decade," by Potter, pages 110–113, 358 and 360.